United States Patent
Voldman et al.

[11] Patent Number: 5,867,888
[45] Date of Patent: Feb. 9, 1999

[54] MAGNETIC HEAD/SILICON CHIP INTEGRATION METHOD

[75] Inventors: Steven H. Voldman, South Burlington, Vt.; Albert J. Wallash, Morgan Hill, Calif.

[73] Assignee: International Business Machines Corporation, Armonk, N.Y.

[21] Appl. No.: 728,289

[22] Filed: Oct. 8, 1996

[51] Int. Cl.⁶ .................. H01L 21/28; H01L 21/301; H01L 21/304; H01L 21/48
[52] U.S. Cl. .................. 29/603.12; 360/103
[58] Field of Search .................. 29/603.12, 603.15, 29/603.16; 360/103, 104

[56] References Cited

U.S. PATENT DOCUMENTS

| | | | |
|---|---|---|---|
| 4,246,695 | 1/1981 | Tsui | 29/603.12 |
| 4,333,229 | 6/1982 | Ellenberger . | |
| 4,951,381 | 8/1990 | Yamazaki et al. | 29/603.12 X |
| 5,095,613 | 3/1992 | Hussinger et al. . | |
| 5,559,051 | 9/1996 | Voldman et al. | 29/603.12 X |
| 5,603,156 | 2/1997 | Biskeborn et al. | 29/603.12 X |

*Primary Examiner*—Linda Johnson
*Attorney, Agent, or Firm*—Merchant, Gould, Smith, Edell, Welter & Schmidt, P.A.

[57] ABSTRACT

A method of integrating slider/head assemblies with silicon chips. The method facilitates the integration of silicon chips containing desirable circuits such as electrostatic discharge protection with slider/head designs such that the slider/head design may be selected independently of the type of silicon chip as long as compatible dimensions are used for each. First a bar of N slider/head assemblies is formed. A bar of N silicon chips is formed and then coupled to the bar of N slider/head assemblies to form an integrated bar of N slider/head/silicon chip units. Leads between the silicon chips and the slider/head assemblies are established. Finally, the integrated bar of N slider/head/silicon chip units is diced into N individual slider/head/silicon chip units. The method also includes the step of lapping the bar of N slider/head assemblies to form magnetic head air bearing surfaces and machining the bar of N slider/head assemblies to decrease the weight of the N slider/head assemblies.

6 Claims, 5 Drawing Sheets

MAGNETIC HEAD/SILICON CHIP INTEGRATION METHOD

BACKGROUND OF THE INVENTION

1. Field of the Invention

This invention relates in general to a method of manufacturing thin film electromagnetic flying head assemblies, and more particularly, to a method of integrating or combining a magnetic head/slider assembly with a silicon chip.

2. Description of Related Art

Disk drive systems are widely used to store data and software for computer systems. A disk drive system generally includes a disk storage media mounted on a spindle such that the disk can rotate thereby permitting an electromagnetic head mounted on a movable arm to read and write information thereon. Data read/write operations are performed by positioning the head to a selected radial position on the surface of the rotating disk. There the head reads or writes data in the form of magnetized regions on the platter coating.

The electromagnetic head for a disk drive system is usually mounted in a carrier called a "slider." The slider serves to support the head and any electrical connections between the head and the rest of the disk drive system. The slider maintains a uniform distance from the surface of the rotating disk to prevent the head from undesirably contacting the disk. This is accomplished by incorporating aerodynamic features into the slider that causes the slider to glide above the disk surface over the moving air.

Computer users constantly hunger for more and more data-storage capacity. Thus, disk drive makers are forever trying to increase the storage capacity of their products. In the process, they are also constantly trying to minimize the actual, physical size of those drives. The accomplishment of these goals requires both shrinking the spacing of the tracks so that more data can fit on a disk and squeezing bits more closely together on the tracks. Thus, disk drive manufacturers must develop heads that are narrower or that record narrower tracks.

Another very important parameter is the height at which the head flies above the surface of the platter. The magnetic field pattern around the gap in the head spreads and weakens very rapidly with distance away from the gap. Because the relevant distance is from the gap to the magnetizable platter coating, the design must include both the air gap (the actual height at which the head flies above the upper surface of the platter) and the thickness of any protective or lubricating overcoating that may have been applied to the platter. Thus, disk drive manufacturers must develop ways of minimizing the height at which the head flies above the disk surface while providing cost effective manufacturing techniques.

Still further, the air bearing surface area is proportional to slider flying height. In order to reduce the head/disk spacing, slider air bearing surface geometry and magnetic head features must therefore become smaller and more intricate. As the nominal head/disk spacing requirements shrink for each new product, air bearing rail and/or pad surface areas and magnetic head assemblies must also become smaller.

As the overall slider dimensions are reduced from nano to pico sizes and smaller to facilitate cost and productivity gains, the slider air bearing surface (ABS) and magnetic head features must also be proportionately scaled. This reduction in slider/head dimensions also increases the need to provide electrostatic protection to the magnetic head.

For example, a magnetic head may be disposed on a titanium carbide ceramic slider body of the dimensions of typically 2.5 mm by 1.7 mm and 0.425 mm thick. On the trailing edge of the magnetic head a magnetic sensor is formed on the edge. This sensor is attached to two gold pads. The magnetic sensor is approximately 2 microns long by 1 micron wide and formed using a 200 Angstrom thin film. This surface is coated with alumina insulator that is 2000 Angstroms thick followed by a permalloy shield made of nickel and iron. The resistance of the magneto-resistive (MR) head is approximately 50 ohms with the resistance of the leads to the gold pads being 10 ohms. Each of these critical elements of a magnetic head becomes more susceptible to destruction by electrostatic discharge as the dimensions are reduced. Nevertheless, any electrostatic discharge protection may be common to a variety of magnetic head designs. However, designing electrostatic discharge protection to each head design would significantly add cost to the head designs. Accordingly, disk drive manufacturers must search for ways to improve the fabrication of magnetic heads.

One example of the fabrication of a thin film head/slider combination is U.S. Pat. No. 5,095,613, issued Mar. 17, 1992, to Hussinger et al., entitled "THIN FILM HEAD SLIDER FABRICATION PROCESS", incorporated herein by reference, which discloses fabricating a head assembly from a bar on which electromagnetic devices are provided as a single row and with like orientation. The bar is integral along a second surface with an adjacent substrate portion. The bar is anchored to a fixture. Head assemblies are formed along the bar where immediately thereafter the individual head assemblies are separated. Then, the surface of the electromagnetic devices are exposed and processed. Finally, the exposed surface is lapped and ground until a desired throat height of the poles and a desired contour of the bar are obtained.

Another method of fabricating thin film head/slider combination is U.S. Pat. No. 4,333,229, issued Jun. 8, 1982, to Michael L. Ellenberger, entitled "METHOD OF MANUFACTURING THIN FILM MAGNETIC HEAD/SLIDER COMBINATION", incorporated herein by reference, which discloses depositing transducers onto a substrate member adjacent a finished and lapped surface in a manner such that no further lapping of the slider rail adjacent the transducer is required. The method includes forming recesses on the substrate member to define slider rails and then forming air bearing surfaces on each rail.

While each of the above patents disclose methods for consolidating an air bearing slider with a magnetic head, the integration of a magnetic head assembly with electrostatic protection and additional circuitry is not provided.

Thus, it can be seen that there is a need for providing a method of combining a magnetic head assembly with a silicon chip containing additional circuitry such as electrostatic discharge protection circuitry, signal processing circuitry or memory circuits.

It can also be seen that there is a need for integrating a silicon chip providing electrostatic protection and other required circuitry with a magnetic head assembly.

SUMMARY OF THE INVENTION

To overcome the limitations in the prior art described above, and to overcome other limitations that will become apparent upon reading and understanding the present specification, the present invention discloses a method of integrating slider/head assemblies with silicon chips.

The present invention solves the above-described problems by providing a method of integrating silicon chips containing desirable circuits such as electrostatic discharge protection with slider/head designs such that the slider/head design may be selected independently of the type of silicon chip as long as compatible dimensions are used for each.

A method in accordance with the principles of the present invention includes the steps of forming a bar of N slider/head assemblies, forming a bar of N silicon chips, coupling the bar of N slider/head assemblies and the bar of N silicon chips to form an unified bar of N slider/head/silicon chip units, establishing leads to electrically connect a slider/head assembly to a silicon chip assembly and dicing the unified bar of N slider/head/silicon chip units into N individual slider/head/silicon chip units.

One aspect of the present invention is that the step of forming a bar of N slider/head assemblies further comprises the steps of forming a slider support structure and fabricating magnetic heads on the support structure.

Another aspect of the present invention is that the bar of N silicon chips comprises N electrostatic discharge protection circuits.

Another aspect of the present invention is that the step of coupling the bar of N slider/head assemblies and the bar of N silicon chips further comprises the steps of depositing a thermoset molding resin on the bar of N silicon chips, merging the bar of N slider/head assemblies with the bar of N silicon chips to form an integrated assembly, and curing the integrated assembly.

Another aspect of the present invention is that the bar of N slider/head assemblies is lapped to form magnetic head air bearing surfaces.

Another aspect of the present invention is that the bar of N slider/head assemblies is machined to decrease the weight of the N slider/head assemblies.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIGS. 3 and 3A illustrate an exemplary pre-processed wafer from which a bar of thin film slider/head assemblies is fabricated;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method for integrating a silicon chip providing electrostatic protection and other required circuitry with a magnetic head/slider assembly.

Figure 1:
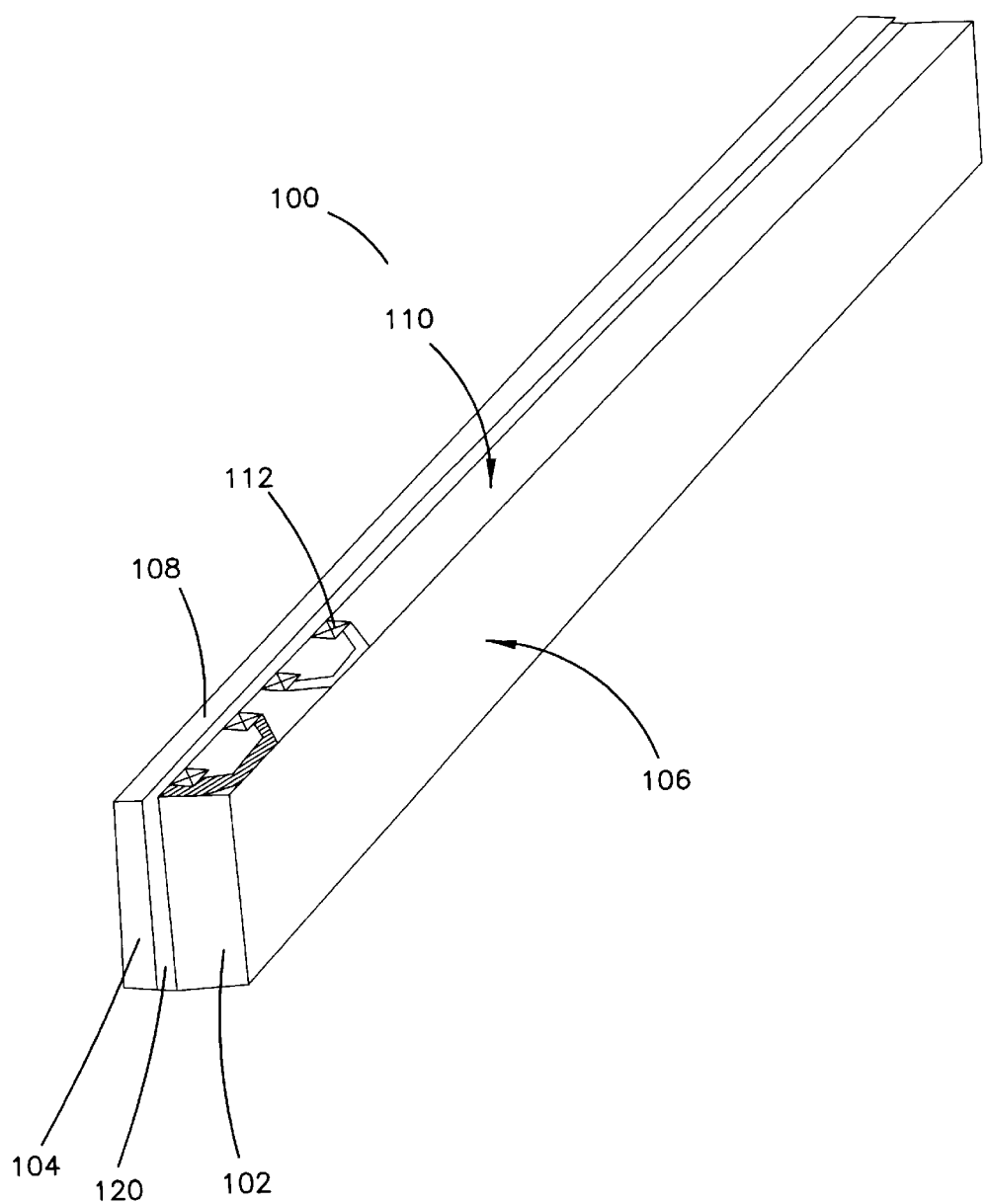
FIG. 1 illustrates an integrated silicon chip/slider body bar according to the present invention.

FIG. 1 illustrates an integrated silicon chip/slider body bar 100 according to the present invention formed from a bar of magnetic head/slider body units 102 that is combined with a bar of silicon chips 104. The bar of silicon chips 104 is coupled to the magnetic head/slider body units 102 diametrically opposed to the air bearing surface of the magnetic head/slider body units 102. The bar of silicon chips 104 may include electrostatic discharge protection circuitry, other signal processing circuitry or memory circuits. Leads 108 for the circuitry in each silicon chip in the bar 104 may be brought to the trailing edge 110. Since the pads 112 for the magnetic heads are also at the trailing edge 110, connections between the bar of N magnetic head/slider body units 102 and the bar of N silicon chips 104 may be made.

Figure 2:
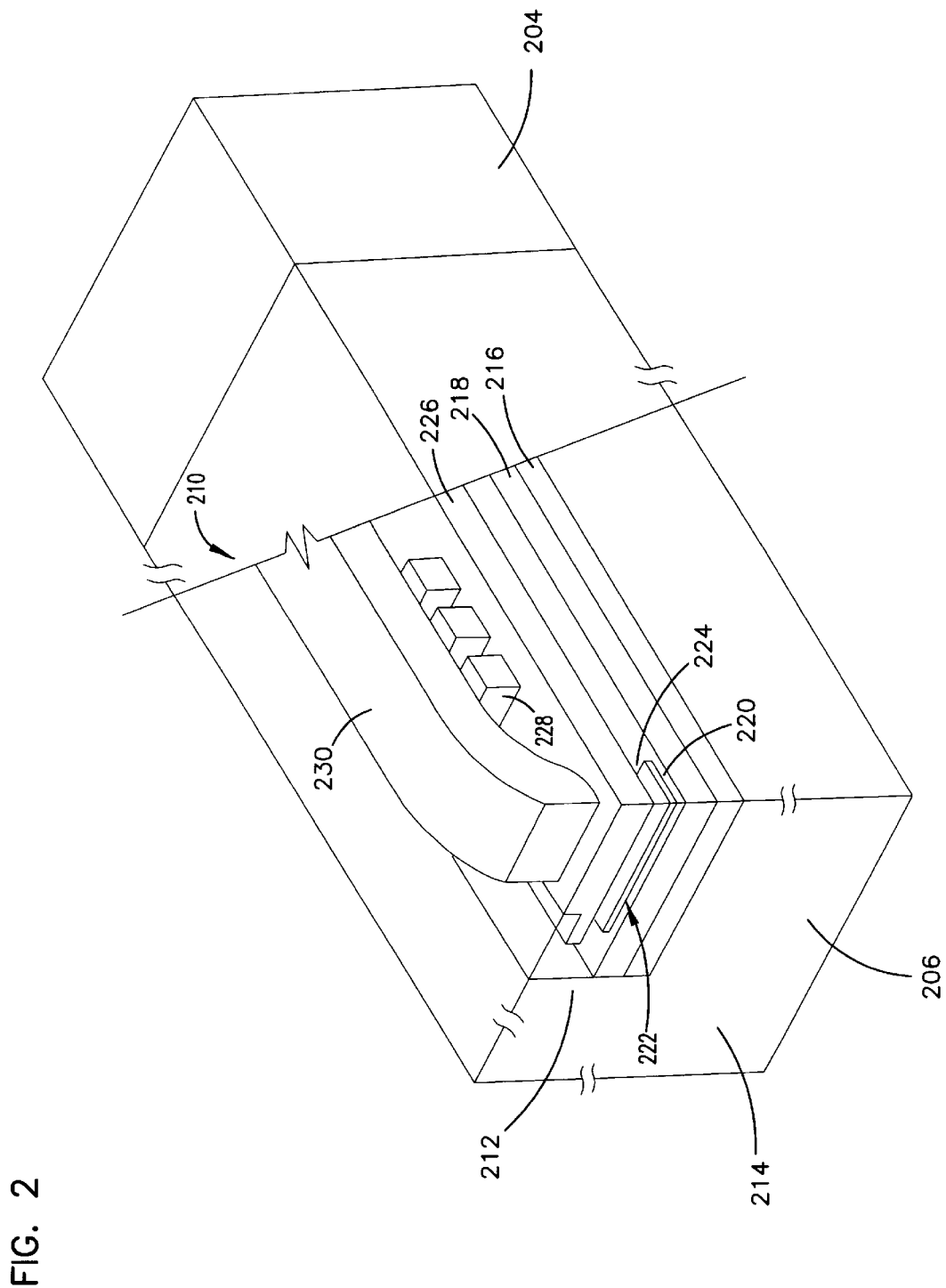
FIG. 2 illustrates a cross-section view of a standard inductive-write, magnetic-read head and slider body combination.

The first step in the process of forming a unified bar of silicon chip and transducers is the fabrication of a transducer including a magnetic head and slider body. FIG. 2 illustrates a cross-section view 210 of a standard inductive-write, magnetic-read head 212 and slider body 214 combination. In addition, FIG. 2 illustrates a silicon chip 204 coupled to the slider body oppositely from the air bearing surface 206. Those skilled in the art will recognize that the invention is not meant to be limited to the particular magnetic head described herein. Other magnetic heads may be fabricated with departing from the scope of the invention.

The head 212 may be constructed on a titanium carbide slider body 214, or alternatively on a silicon slider body. For purposes of example, a titanium carbide slider body will be discussed herein. However, those skilled in the art will recognize that the invention is not meant to be limited to a particular type of slider body composition.

First, a TiC wafer 214 is defined. An insulating film 216 is deposited on the TiC wafer 214. The insulating film 216 is typically alumina. A first shield film 218 is deposited for the first shield definition. The first shield 218 is typically a permalloy material such as nickel/iron alloy. This serves as a magnetic shield which prevents the magnetic field from distorting the field associated with the information being read.

A first dielectric film 220 is placed over the first shield 218. A magneto-resistive film 222 is deposited to define the magnetoresistive sensor element. A second dielectric film 224 is then deposited. A second shield film 226 is deposited on dielectric film 224 for a second shield definition. Again, the shield is typically a permalloy material such as nickel/iron alloy. Thus, the dielectric films 220, 224 prevent the MR sensor element 222 from coming into direct electrical contact with either the first 218 or second 226 shield. The second shield 226 also serves as a magnetic shield which prevents the magnetic field from distorting the field associated with the information being read. However, those skilled in the art will recognize that unshielded structures may also be constructed without departing from the teaching of the present invention.

The standard MR head 212 may be integrated with the inductive head by using the second MR shield 226 as the yoke of the inductive head. Then an inductive coil 228 may be defined around a second inductive pole piece 230.

Figure 3:
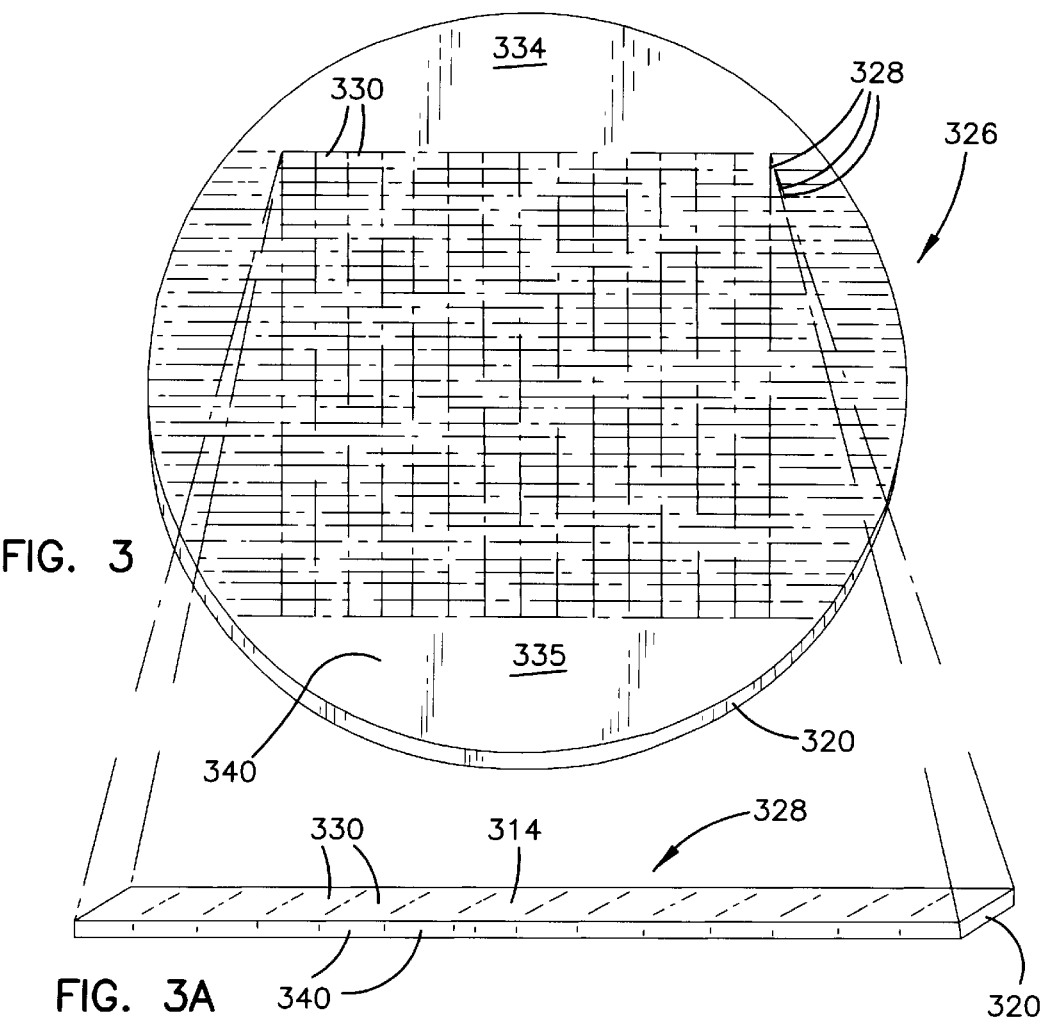

FIG. 3 illustrates an exemplary pre-processed wafer from which a thin film slider/head assembly, as illustrated for example in FIG. 2, is fabricated. The wafer 326 comprises a wafer substrate 320 that is made of $Al_2O_3$-TiC or other suitable material. The wafer substrate 320 is covered by a thin layer 340 of $Al_2O_3$. The electromagnetic devices 330 are formed in the layer 340. The devices 330 are arranged in rows and are identically oriented.

Specifically, the wafer 326 comprises a matrix of slider units 330 which when fully processed will becomes sliders. The view shown in FIG. 3A is an end view of the individual units 330. As shown in FIG. 3, a plurality of identical bars 328 each of which comprises a row of identical slider units 330, together with superfluous sections, such as a top section 334 and a bottom section 335, constitute the wafer 326.

A wafer may be fabricated to contain any desirable number of rows 328 of slider units 330 and any desirable number of slider units 330 in each row 328. For example, the pre-processed wafer 326 shown in FIG. 3A may contain thirty two rows of slider units 330 and fourteen slider units 330 in each row.

At this point, the air bearing surface 314 of the magnetic head 330 may be lapped to, for example, obtain a desirable throat height for the poles in the magnetic head 330. Alternatively, the magnetic head air bearing surface lapping may be performed after complete integration of the slider/ head assembly with the silicon chip. In any event, the head/slider assembly 330 is machined to ten percent of its original thickness to decrease the weight of the assembly 330.

Figure 4:
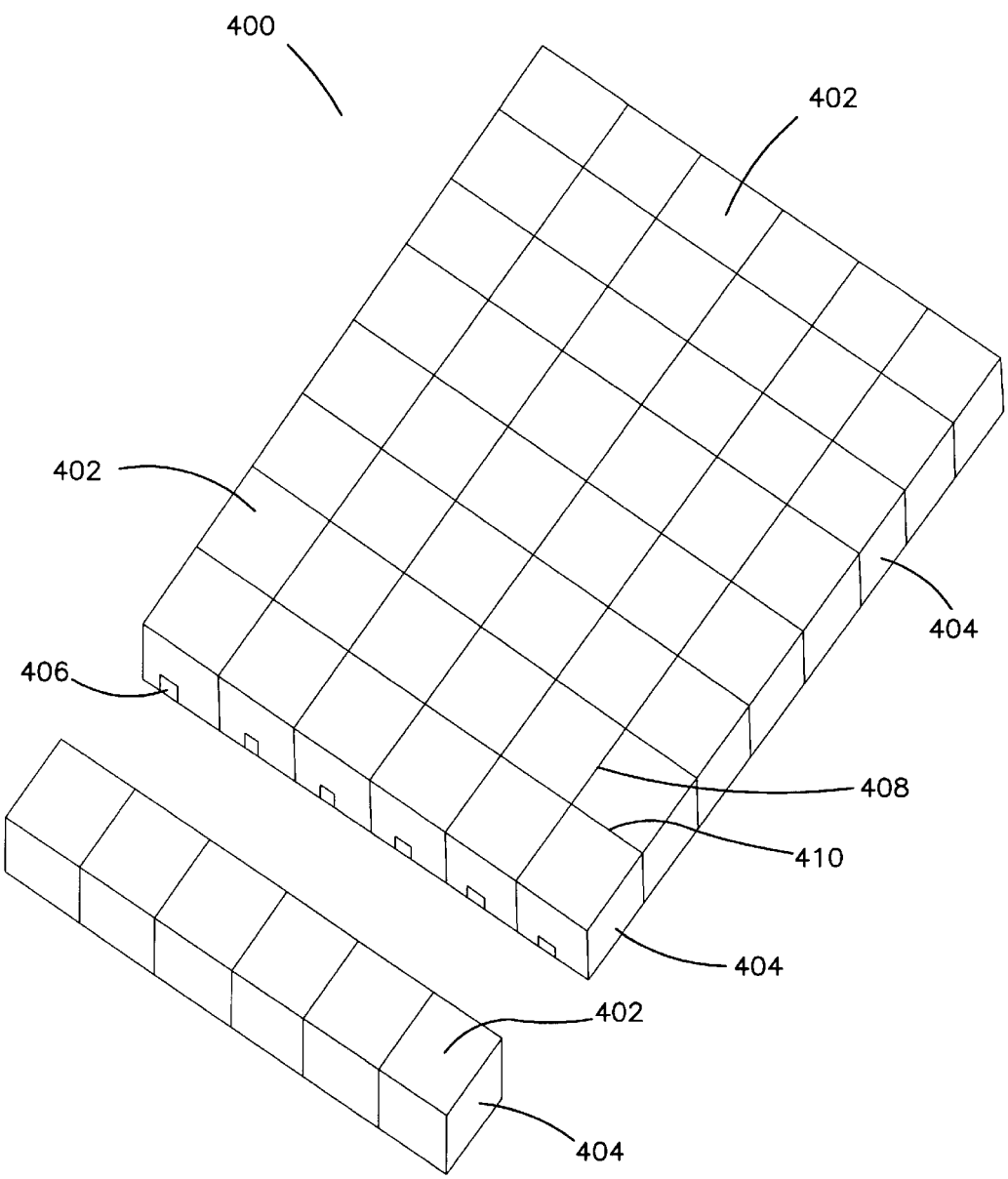
FIG. 4 illustrates a silicon chip cube according to the present invention.

FIG. 4 illustrates a wafer of silicon chips 400. Each of the silicon chips 402 contain the desired electrostatic discharge protection circuits and any other circuitry that is desired to reach the magnetic head. For example, the silicon chip may include electrostatic discharge protection circuits as disclosed in the co-pending and commonly assigned application Ser. No. 08/728,297 filed on Oct. 08, 1996 by Steven Voldman and Albert Wallash entitled "METHOD AND APPARATUS FOR PROVIDING ELECTROSTATIC DISCHARGE PROTECTION FOR AN INDUCTIVE COIL", now U.S. Pat. No. 5,777,829 which application is hereby incorporated by reference. Normally, the silicon wafer 400 is diced in both the X 408 and Y 410 direction to form individual units 402. However, according to the present invention, the silicon wafer 400 is only diced in the Y 410 direction to form bars 404 of silicon chips 402. The footprint of the silicon chips 402 are designed to match those of the head/slider assemblies (shown in FIG. 3A). Further, each bar 404 of silicon chips 402 contains the same number of silicon chips 402 as head/slider units or assemblies in the magnetic head/slider bars. Transfer metal leads 406 are brought to the edge of each silicon chip 402, where the bar 404 of silicon chips 404 are sliced, so that the silicon chip circuits 402 may be electrically coupled to the magnetic heads.

Now referring back to FIG. 1, to couple the bar of silicon chips 104 to the bar of magnetic heads/slider body units 102, a layer of a thermoset molding resin 120, such as polyimide, is deposited on the silicon chip bar 104. The silicon chip bar 104 is brought together with the bar of magnetic heads/slider body units 102 opposite to the air bearing surface 106. Then the assembly 100 is baked to establish permanence to the connection. The pads 112 on the bar of magnetic head/slider body units 102 are therefore exposed on the same side with the leads 108 on the bar of silicon chips 104. Then, the metal leads 108 of the silicon chips are coupled to corresponding magnetic heads. As mentioned above, the magnetic head air bearing surface lapping may now be completed, if not previously completed. Finally, the integrated magnetic head/ silicon chip bars 100 are diced to provide individual head/ slider/silicon chip assemblies.

Figure 5:
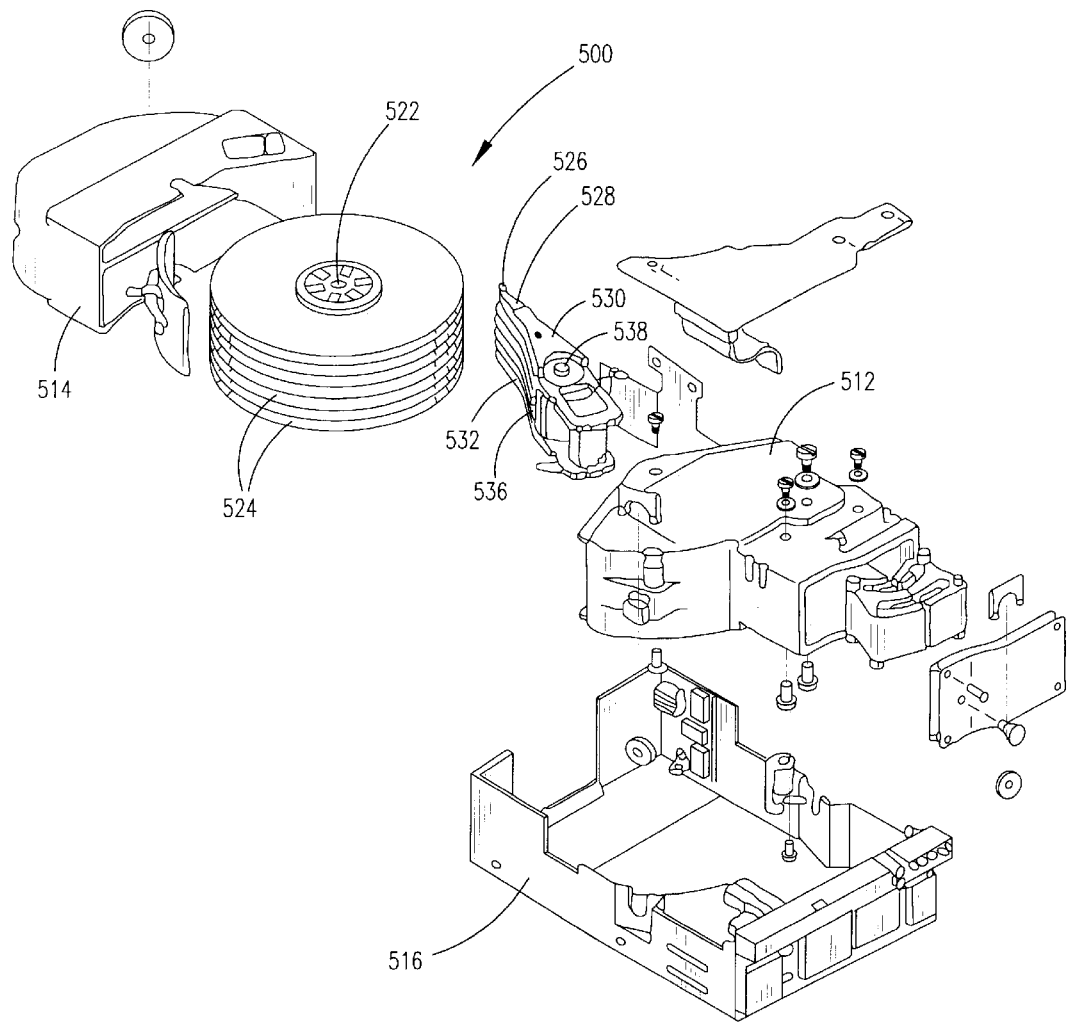
FIG. 5 is an exploded view of an exemplary disk drive according to the present invention.

FIG. 5 is an exploded view of a disk drive 500. The disk drive 500 includes a housing 512 and a housing cover 514 which, after assembly, is mounted within a frame 516. Mounted within the housing is a spindle shaft 522. Rotatably attached to the spindle shaft 522 are a number of disks 524. In FIG. 5, eight disks 524 are attached to the spindle shaft 522 in spaced apart relation. The disks 524 rotate on spindle shaft 522 which is powered by a motor (not shown). Information is written on or read from the disks 524 by magnetic head/silicon chip assemblies 526 at the end of an actuator arm assembly 536. Preferably, magnetic head/ silicon chip assemblies 526 in accordance with the invention are coupled to the suspensions or load springs 528. The load springs 528 cause the heads to fly high in textured zones and lower in the data zones. The load springs 528 are attached to separate arms 530 on an E block or comb 532. The E block or comb 532 is attached at one end of the actuator arm assembly 536. The actuator arm assembly 536 is rotatably attached within the housing 512 on an actuator shaft 538. However, the invention is not meant to be limited to the disk drive described above.

Thus, a method for integrating a silicon chip which provides electrostatic protection and other required circuitry with a magnetic head/slider assembly has been disclosed. The bar integration method according to the present invention increases productivity while having a minimal effect on the weight and aerodynamics of the TiC slider. Further, integration of electrostatic protection is provided which is independent to the selection of what magnetic head designs will be implemented.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of integrating a slider/head assembly with a silicon chip, comprising the steps of:

forming a bar of N slider/head assemblies;

forming a bar of N silicon chips;

coupling the bar of N slider/head assemblies and the bar of N silicon chips to form an integrated bar of N slider/head/silicon chip units;

establishing leads to electrically couple a slider/head assembly to a silicon chip assembly; and dicing the integrated bar of N slider/head/silicon chip units into N individual slider/head/silicon chip units.

2. The method of claim 1 wherein the step of forming a bar of N slider/head assemblies further comprises the steps of forming a slider support structure and fabricating magnetic heads on the support structure.

3. The method of claim 1 wherein the bar of N silicon chips comprises N electrostatic discharge protection circuits.

4. The method of claim 1 wherein the step of coupling the bar of N slider/head assemblies and the bar of N silicon chips further comprises the steps of depositing a thermoset molding resin on the bar of N silicon chips, merging the bar of N slider/head assemblies with the bar of N silicon chips to form an integrated assembly, and curing the integrated assembly.

5. The method of claim 1 further comprising the step of lapping the bar of N slider/head assemblies to form magnetic head air bearing surfaces.

6. The method of claim 1 further comprising the step of machining the bar of N slider/head assemblies to decrease the weight of the N slider/head assemblies.

\* \* \* \* \*

UNITED STATES PATENT AND TRADEMARK OFFICE
CERTIFICATE OF CORRECTION

PATENT NO.     : 5,867,888                                         Page 1 of 1
DATED          : February 9, 1999
INVENTOR(S)    : Steven H. Voldman and Albert J. Wallash It is certified that error appears in the above-identified patent and that said Letters Patent is hereby corrected as shown below:

<u>Column 4,</u>
Line 27, change "with" to --without--

<u>Column 5,</u>
Line 2, change "becomes" to --become--

Signed and Sealed this

Twenty-sixth Day of June, 2001

Attest:

NICHOLAS P. GODICI
*Attesting Officer*    *Acting Director of the United States Patent and Trademark Office*